(12) United States Patent
Choi et al.

(10) Patent No.: US 11,780,325 B2
(45) Date of Patent: Oct. 10, 2023

(54) FUEL CAP FOR VEHICLE HAVING LOCKING STRUCTURE GENERATING SOUND INTERVAL

(71) Applicants: Hyundai Motor Company, Seoul (KR); Kia Corporation, Seoul (KR)

(72) Inventors: Seung-Hoon Choi, Seoul (KR); June-Young Park, Gyeonggi-do (KR); Tae-Yoon Lee, Seoul (KR); Jun-Sik Lim, Gyeonggi-do (KR); Sung-Won Lee, Gyeonggi-do (KR); Raghavendar Peddi, Hyderabad (IN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/089,321

(22) Filed: Dec. 27, 2022

(65) Prior Publication Data

US 2023/0135107 A1 May 4, 2023

Related U.S. Application Data

(62) Division of application No. 16/151,264, filed on Oct. 3, 2018, now Pat. No. 11,590,838.

(30) Foreign Application Priority Data

Dec. 12, 2017 (KR) .................. 10-2017-0170249

(51) Int. Cl.
*B60K 15/04* (2006.01)

(52) U.S. Cl.
CPC .. *B60K 15/0406* (2013.01); *B60K 2015/0438* (2013.01); *B60K 2015/0441* (2013.01)

(58) Field of Classification Search
CPC ............ B60K 15/0406; B60K 15/0441; B60K 15/0438; B65D 55/02
See application file for complete search history.

(56) References Cited

U.S. PATENT DOCUMENTS

| 6,076,695 A | 6/2000 | Palvoelgyi et al. |
| 6,325,233 B1 * | 12/2001 | Harris ................ B60K 15/0406 220/288 |
| 6,796,451 B2 * | 9/2004 | Harris .................. F01P 11/0247 220/203.26 |
| 2005/0115971 A1 | 6/2005 | Hagano |

(Continued)

FOREIGN PATENT DOCUMENTS

| EP | 1 040 952 A2 | 10/2000 |
| EP | 1 162 099 A2 | 12/2001 |
| EP | 1 170 163 A2 | 1/2002 |

(Continued)

*Primary Examiner* — Anthony D Stashick
*Assistant Examiner* — Raven Collins
(74) *Attorney, Agent, or Firm* — Fox Rothschild LLP

(57) ABSTRACT

A fuel cap for a vehicle has a locking structure configured to generate a sound interval, including a head portion having a handle formed at a first side and one or more striking portions installed at a second side, and a body portion integrally assembled with the head portion and having a plurality of sound generators installed at the body portion and disposed in a state of being struck by the one or more striking portions installed at the second side of the head portion according to a rotation of the head portion by a locking torque.

14 Claims, 10 Drawing Sheets

(56) References Cited

U.S. PATENT DOCUMENTS

2006/0283860 A1    12/2006   Homma et al.

FOREIGN PATENT DOCUMENTS

| | | |
|---|---|---|
| JP | 2004-244088 A | 9/2004 |
| JP | 2006-182250 A | 7/2006 |
| JP | 2006-224775 A | 8/2006 |
| KR | 1997-008762 | 3/1997 |
| KR | 20-2008-0003417 U | 8/2008 |
| KR | 10-0888172 B1 | 3/2009 |

* cited by examiner

FUEL CAP FOR VEHICLE HAVING LOCKING STRUCTURE GENERATING SOUND INTERVAL

CROSS-REFERENCE TO RELATED APPLICATION

This Application is a Divisional of application Ser. No. 16/151,264 filed on Oct. 3, 2018. Application Ser. No. 16/151,264 claims the benefit of priority to Korean Patent Applications No. 10-2017-0170249 filed on Dec. 12, 2017, the entire contents of which are incorporated herein by reference.

BACKGROUND

(a) Technical Field

The present disclosure relates to a fuel cap for a vehicle, more particularly, to the fuel cap having a locking structure generating a sound interval, which generates a locking sound in various sound intervals.

(b) Description of Related Art

Generally, a vehicle is provided with a fuel tank configured to store fuel, and the fuel tank is installed and connected to an engine and a fuel pump and supplies the fuel stored in the fuel tank to the engine through the fuel pump.

The fuel tank includes a fuel inlet through which the fuel is received, and a fuel cap engaged with the fuel inlet and configured to seal the fuel inlet.

The fuel cap is formed in a structure for easily and reliably sealing the fuel inlet within a short period of time. That is, the fuel inlet and the fuel cap are each formed in a structure of being rotatably opened or closed by forming a screw thread on each of the fuel inlet and the fuel cap.

The fuel cap is configured such that, when the fuel inlet is reliably sealed, a cyclic sound, e.g., a "snapping sound," is continuously generated to allow a user to verify a sealed state of the fuel inlet.

As described above, the fuel cap should be able to prevent leakage of the fuel, open or close the fuel inlet before or after refueling, and generate the locking sound which allows the user to recognize that the fuel cap is fully locked when the user locks the fuel cap. The fuel cap generally is configured with a cap body and a head portion, and when the fuel cap is fully locked and the cap body is fixed, the head portion is rotated and then a fin shape of the head portion passes over a fin of the cap body to generate a one-shot sound, that is, a locking sound.

The existing locking sound of the fuel cap is monotonous, and volume of the locking sound is varied according to quality deviation such that customer awareness may be low, and operation thereof does not provide any amusement to the customer.

Further, the locking sound of the fuel cap may be included in an evaluation item of an initial quality study (IQS) to affect brand awareness. Therefore, when the existing locking sound of the fuel cap is merely a monotonous clicking sound, an item score may drop in an IQS survey result.

Accordingly, there is a need for the locking sound of the fuel cap to provide a function for amusing a customer by supplementing the existing function of verifying only a locked state of the fuel cap.

SUMMARY

An embodiment of the present disclosure is directed to a fuel cap for a vehicle having a locking structure generating a sound interval, which is capable of changing a feel thereof to a driver by providing amusement to the driver through implementation of the locking structure, which generates a locking sound in various sound intervals, inside the fuel cap for a vehicle.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a fuel cap for a vehicle, which has a locking structure configured to generate a sound interval, includes a head portion having a handle formed at a first side and one or more striking portions installed at a second side, and a body portion integrally assembled with the head portion and having a plurality of sound generators installed at the body portion and disposed in a state of being struck by the one or more striking portions installed at the second side of the head portion according to a rotation of the head portion by a locking torque.

In accordance with another embodiment of the present disclosure, a fuel cap for a vehicle, which has a locking structure configured to generate a sound interval, includes a head portion having a handle formed at a first side and a plurality of sound generators installed at a second side, and a body portion integrally assembled with the head portion and having one or more striking portions installed at the body portion and disposed in a state of being struck by the plurality of sound generators installed at the second side of the head portion according to a rotation of the head portion by a locking torque.

Each of the striking portions may be installed at a circular frame having an installation recess configured to dispose, fix, and space apart the striking portions at predetermined intervals.

Each of the striking portions may be disposed on a circumference formed by the circular frame.

Each of the striking portions may include one end inserted into and supported on the circular frame and wound in a spring shape, and another end configured to strike the plurality of sound generators and formed in a shape in which a distal portion of the another end is bent inward.

The plurality of sound generators may be grouped into a predetermined number of sound generators, the predetermined number of sound generators may be repeatedly disposed, and the plurality of sound generators may be pipe-shaped cylinders and have different outer diameters.

The head portion and the body portion may be integrally rotated when the fuel cap for a vehicle is locked to a fuel inlet of the vehicle, and, at a time when the fuel cap for a vehicle is locked to the fuel inlet of the vehicle, the body portion may be fixed by thread locking and the head portion may be further rotated by the locking torque.

Each of the plurality of sound generators may have a spiral-structured plate shape, and the plurality of sound generators may be of different lengths, a first protrusion may be formed to protrude toward the striking portion at a distal end of each of the plurality of sound generators, each of the striking portions may have a bar shape, and a second projection may be formed to protrude toward each of the plurality of sound generators at a position of a distal end of each of the striking portions, wherein the position corresponds to the first protrusion.

Each of the first protrusion and the second protrusion may be formed in a rounded shape.

DESCRIPTION OF SPECIFIC EMBODIMENTS

Figure 1:
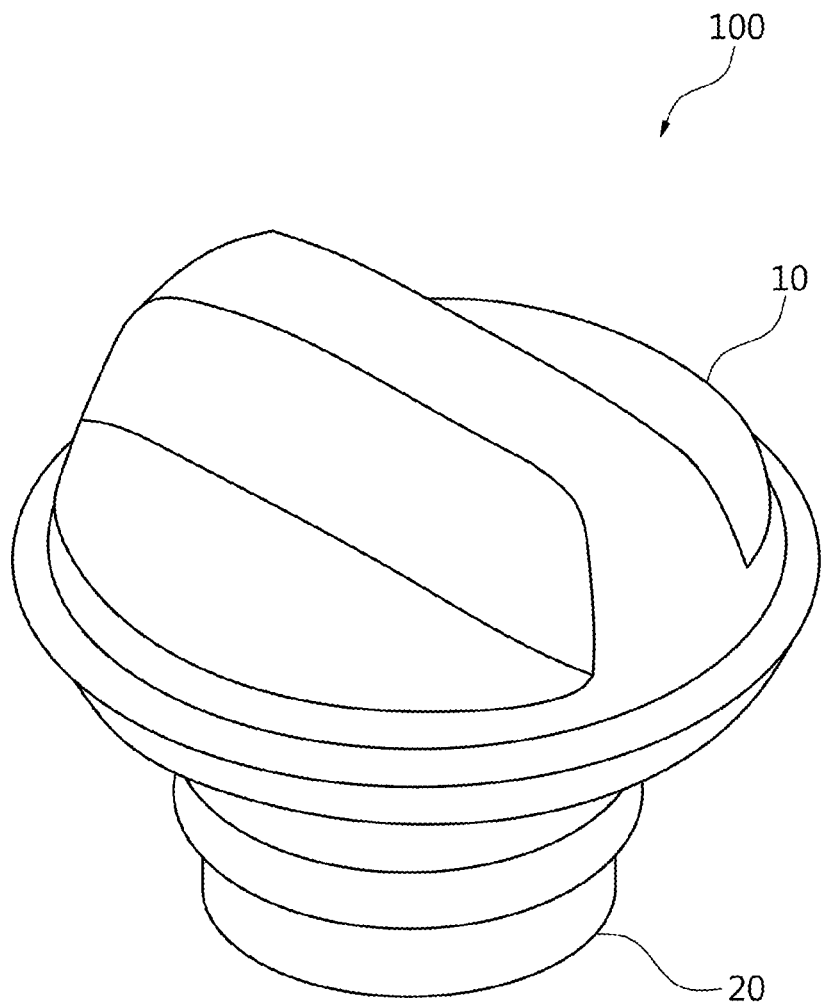
FIG. 1 is a view illustrating a fuel cap for a vehicle having a locking structure generating a sound interval according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings. However, in the following description and the accompanying drawings, if it is determined that well-known functions or configurations may obscure the gist of the present disclosure, detailed descriptions thereof will be omitted. Further, it is noted that the same components are denoted by the same reference numerals throughout the drawings.

Embodiments of the present disclosure will be fully described in a detail below which is suitable for implementation by those skilled in the art with reference to the accompanying drawings. However, the present disclosure may be implemented in various different forms, and thus it is not limited to embodiments to be described herein. In the drawings, some portions not related to the description will be omitted in order to clearly describe the present disclosure, and similar reference numerals are given to similar components throughout the disclosure.

Hereinafter, preferred embodiments of the present disclosure will be described in detail with reference to the accompanying drawings.

Figure 2:
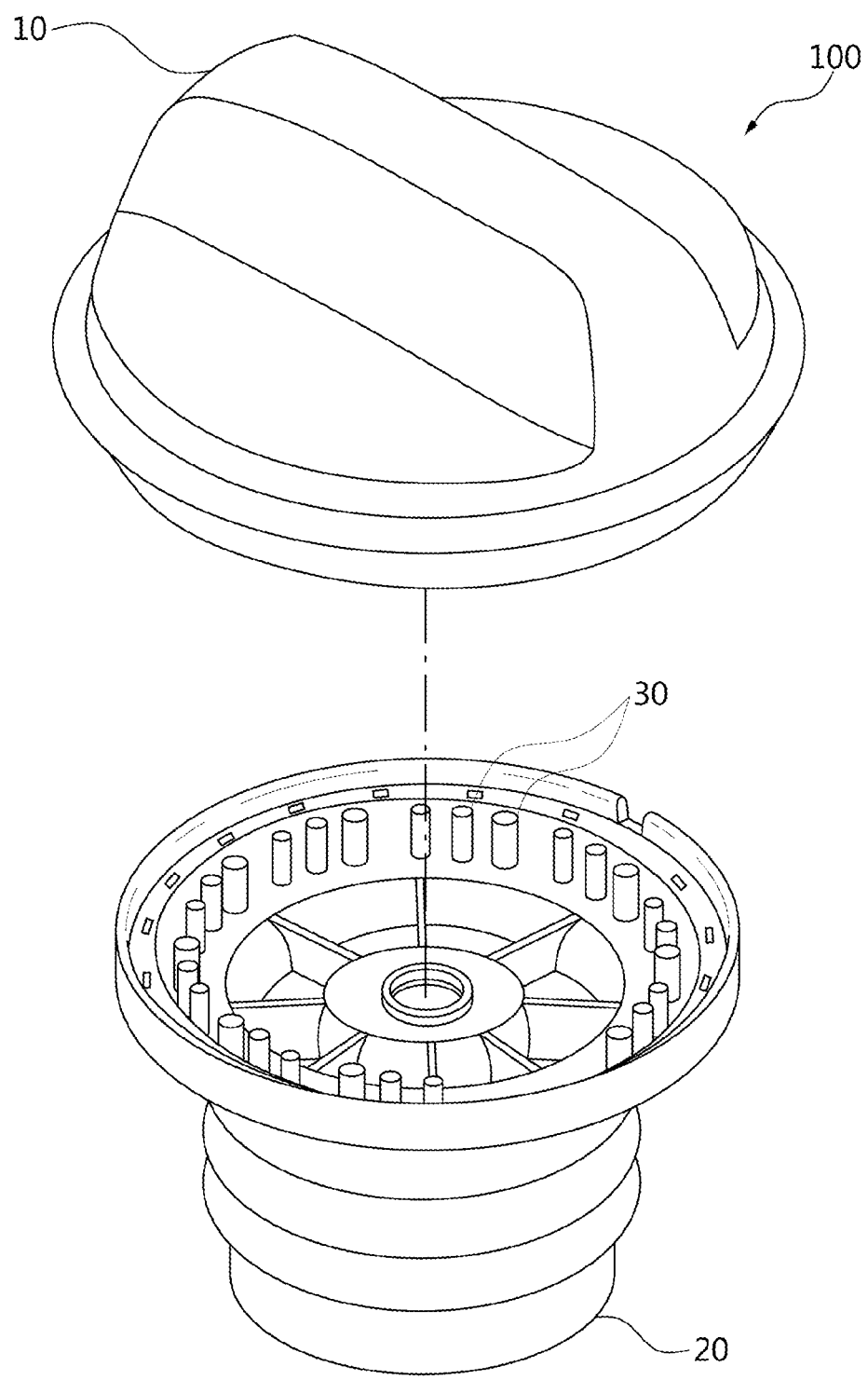
FIG. 2 is a view illustrating a disassembled state of a head portion and a body portion of a fuel cap for a vehicle according to a first embodiment of the present disclosure.
Figure 3:
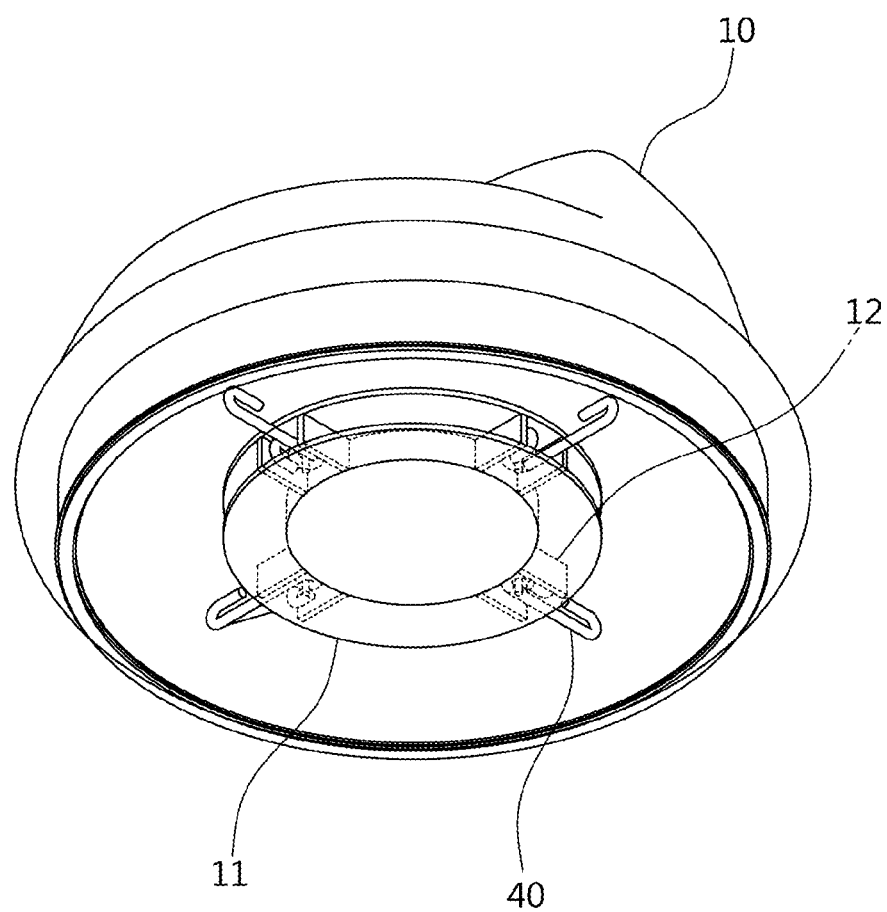
FIG. 3 is a view illustrating the head portion of the fuel cap for a vehicle shown in FIG. 2.
Figure 4:
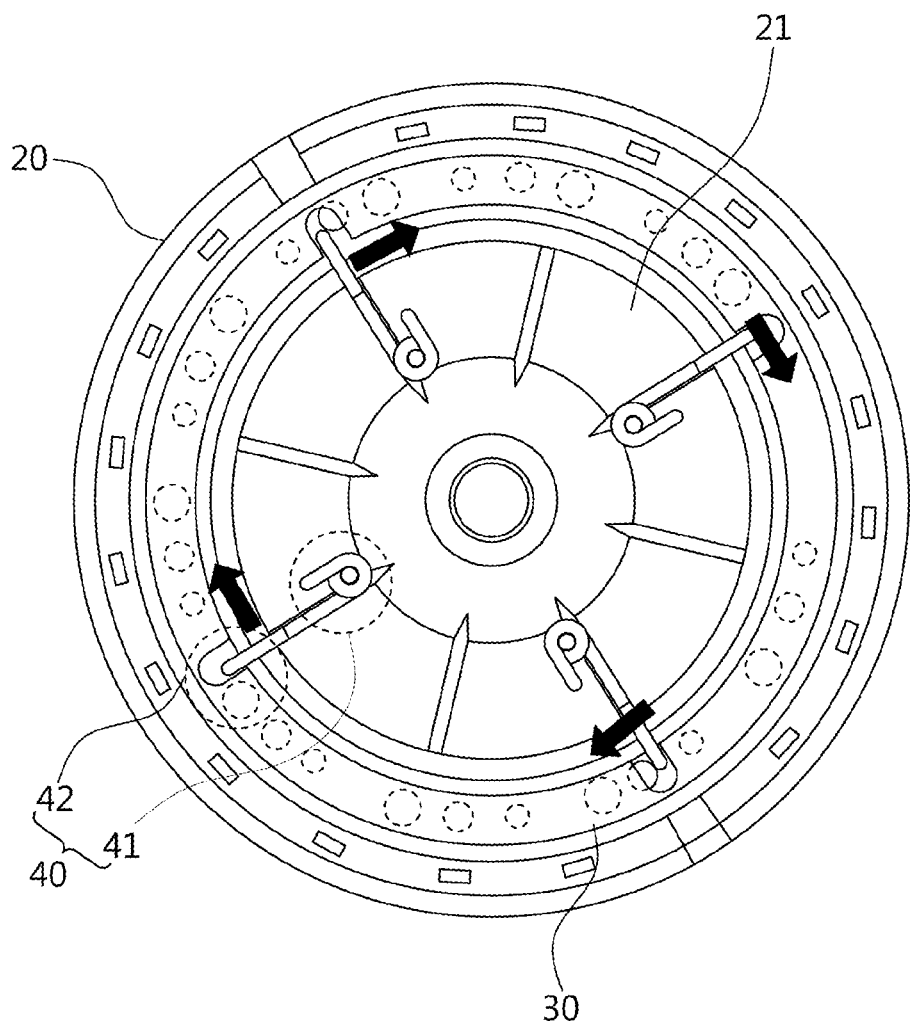
FIG. 4 is a view illustrating the body portion of the fuel cap for a vehicle shown in FIG. 2.

FIG. 1 is a view illustrating a fuel cap for a vehicle having a locking structure generating a sound interval according to an embodiment of the present disclosure, FIG. 2 is a view illustrating a disassembled state of a head portion and a body portion of a fuel cap for a vehicle according to a first embodiment of the present disclosure, FIG. 3 is a view illustrating the head portion of the fuel cap for a vehicle shown in FIG. 2, and FIG. 4 is a view illustrating the body portion of the fuel cap for a vehicle shown in FIG. 2.

As shown in FIGS. 1 to 4, a fuel cap 100 having a locking structure configured to generate a sound interval (also referred to herein as a "fuel cap 100 for a vehicle") according to an embodiment of the present disclosure is capable of changing feel of a driver and providing amusement to the driver by implementing the locking structure, which generates a locking sound in various sound intervals, inside the fuel cap 100 for a vehicle. That is, the fuel cap 100 for a vehicle provides a conventional simplified function for verifying lock and as well, a function for impressing a customer by adding amusement.

The fuel cap 100 for a vehicle is integrally formed with a head portion 10 and a body portion 20.

First, the fuel cap 100 for a vehicle is formed in a structure capable of preventing leakage of fuel and being opened or closed while refueling. That is, a handle configured to manipulate the fuel cap 100 for a vehicle is formed at the head portion 10, the body portion 20 is configured with a thread locking structure for locking the fuel cap 100 for a vehicle, and a screw thread is formed on an outer circumference of the body portion 20 to allow the body portion 20 to be rotatably opened or closed relative to a fuel inlet of a vehicle. In this case, a driver opens or closes the fuel cap 100 for a vehicle by holding the head portion 10 of the fuel cap 100 for a vehicle.

Next, when the fuel cap 100 for a vehicle reliably seals the fuel inlet, the fuel cap 100 for a vehicle generates a locking sound which is expressed in several sound intervals. As described above, an active way is applied to the fuel cap 100 for a vehicle to improve feel of a customer by adding amusement through the locking sound expressed in the various sound intervals rather than a passive way for improving volume and clarity of the locking sound.

To this end, as a configuration for generating a locking sound according to one embodiment, which is provided at surfaces facing each other of the head portion 10 and the body portion 20, a striking portion 40 is installed at the head portion 10 and a sound generator 30 is formed at the body portion 20. The striking portion 40 strikes the sound generator 30 to generate a sound, and the sound generator 30 generates a locking sound by the strike of the striking portion 40. The striking portion 40 and the sound generator 30 are each made of a metal material.

A circular frame 11 configured to dispose the striking portion 40 is formed on the surface of the head portion 10 facing the body portion 20 when the head portion 10 and the body portion 20 are assembled. At this point, an installation recess 12 is formed at the circular frame 11 to dispose, fix and space apart the striking portions 40 at predetermined regular intervals. Here, four striking portions 40 are disposed on a circumference formed by the circular frame 11 at an interval of 90 degrees.

The striking portion 40 is formed in a spring structure in which striking strength by an elastic force can be set. That is, one end 41 of the striking portion 40 is a portion which is inserted into the circular frame 11 to be supported thereon and is wound in a spring shape. In this case, when a short bar portion is inserted into and supported on the installation recess 12 of the circular frame 11, an elastic force of a long bar portion striking the sound generator 30 may be formed along a circumferential direction in which the sound generator 30 is disposed.

The other end 42 of the striking portion 40 is a portion which strikes the sound generator 30, and a distal portion of the other end 42 is bent inward to secure a strike area for the sound generator 30.

The sound generator 30 is disposed on the surface of the body portion 20 facing the head portion 10 when the body portion 20 and the head portion 10 are assembled. At this point, the sound generator 30 is formed on a circumference of which radius is a distance from the center of a circle to a position at which the other end 42 of the striking portion 40 is located.

The sound generator 30 is a pipe-shaped cylinder and may determine a sound interval, which will be generated, according to an outer diameter of the sound generator 30, and a low-note sound is generated as the outer diameter increases. Here, a case in which three consecutive sound generators 30 having gradually increased different outer diameters are grouped and repeatedly disposed is illustrated. Further, the sound generator 30 may determine a sound interval, which will be generated, according to a height of the sound generator 30.

An accommodation space 21 is formed at the body portion 20 to accommodate the circular frame 11 when the body portion 20 is assembled with the head portion 10.

Alternatively, a desired chord may be set by adjusting the number of the striking portions 40 and the number of the sound generators 30. For example, when the number of the striking portions 40 is three and the sound generators 30 expressing do/mi/sol sound intervals are simultaneously struck by the three striking portions 40, a do/mi/sol chord may be generated as the locking sound of the fuel cap 100 for a vehicle. Thus, any sound intervals may be expressed according to the arrangement of the striking portion 40 and the sound generator 30.

The fuel cap 100 for a vehicle may be operated as follows.

First, when the fuel cap 100 for a vehicle is rotated and locked to the fuel inlet, the head portion 10 and the body portion 20 are integrally rotated.

The body portion 20 is fixed by thread locking at a time when the fuel cap 100 for a vehicle is locked to the fuel inlet. Then, after the body portion 20 is fixed by thread locking, the head portion 10 is further rotated by a locking torque (a force for a complete sealing).

In this case, since the striking portion 40 of the head portion 10 is inserted into and fixed to the circular frame 11 of the head portion 10, the striking portion 40 is integrally rotated together with the head portion 10. Thus, the striking portion 40 of the head portion 10 strikes the sound generator 30 of the fixed body portion 20 while rotated. At this point, the sound generator 30 of the body portion 20 generates a sound due to the strike of the striking portion 40.

As described above, the fuel cap 100 for a vehicle may generate a locking sound expressed by certain sound intervals according to the arrangement of the striking portion 40 and the sound generator 30 and the number thereof. For example, the fuel cap 100 for a vehicle may generate three sound intervals (i.e., a do→mi→sol chord) by further rotating the head portion 10 owing to the locking torque.

Figure 5:
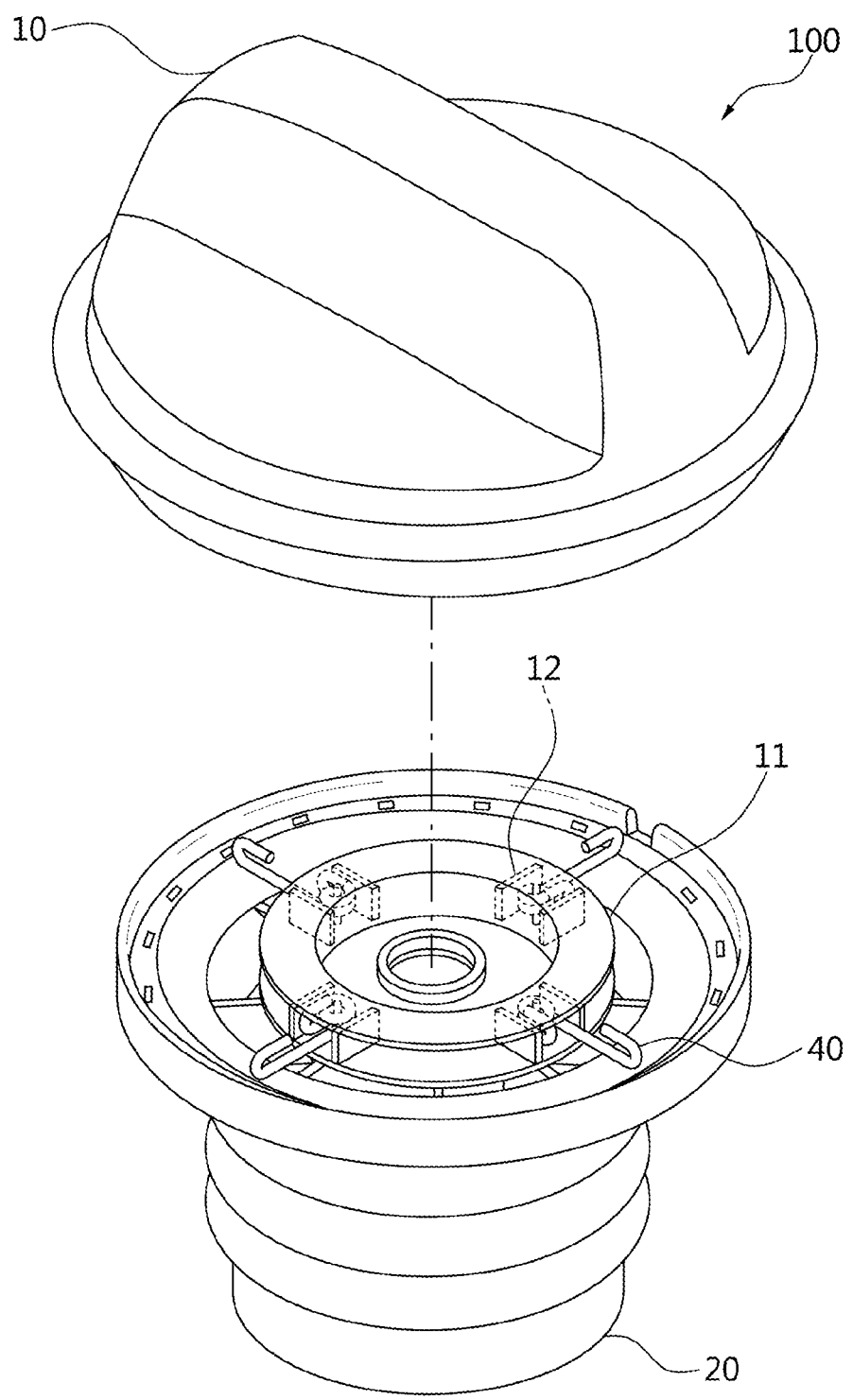
FIG. 5 is a view illustrating a disassembled state of a head portion and a body portion of a fuel cap for a vehicle according to a second embodiment of the present disclosure.
Figure 6:
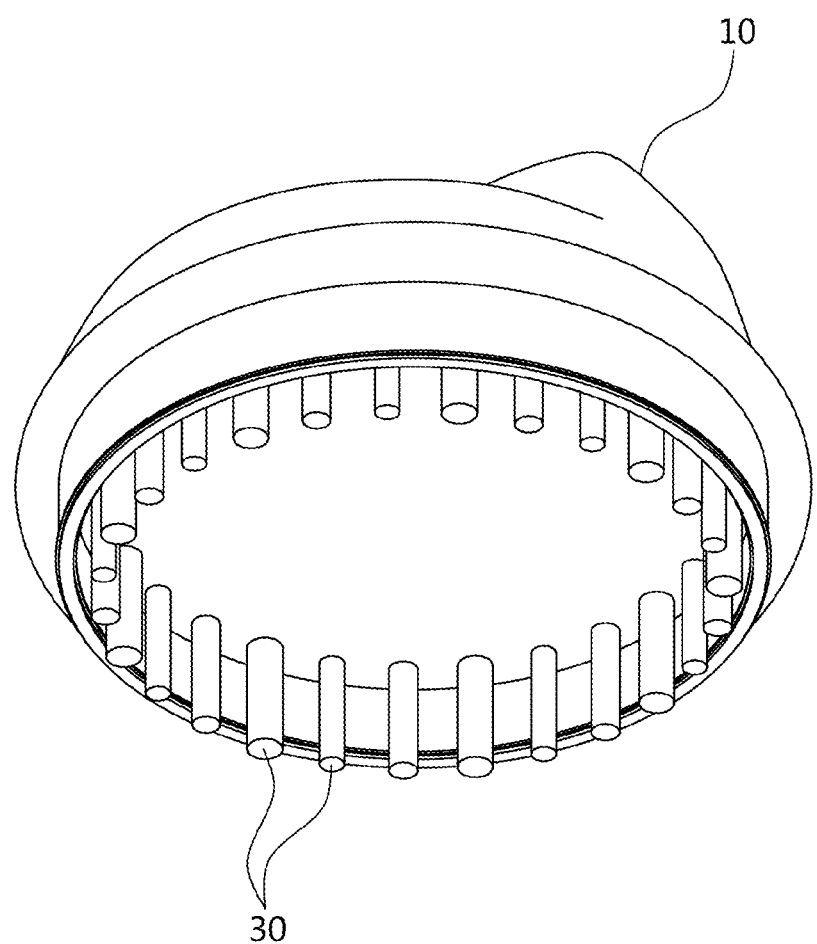
FIG. 6 is a view illustrating the head portion of the fuel cap for a vehicle shown in FIG. 3.

FIG. 5 is a view illustrating a disassembled state of a head portion and a body portion of a fuel cap for a vehicle according to a second embodiment of the present disclosure, and FIG. 6 is a view illustrating the head portion of the fuel cap for a vehicle shown in FIG. 3.

Detailed descriptions of FIGS. 5 and 6 overlap with those of FIGS. 1 to 4, and thus they will be omitted.

Referring to FIGS. 5 and 6, as a configuration for generating a locking sound according to another embodiment, which is provided at surfaces facing each other of the head portion 10 and the body portion 20, a sound generator 30 is installed at the head portion 10 and a striking portion 40 is formed at the body portion 20. That is, the sound generator 30 is formed on a circumference of which radius is a distance from the center of head portion 10 to a position at which the other end 42 of the striking portion 40 is located. The striking portion 40 is inserted into the circular frame 11 and then installed at the body portion 20.

Figure 7:
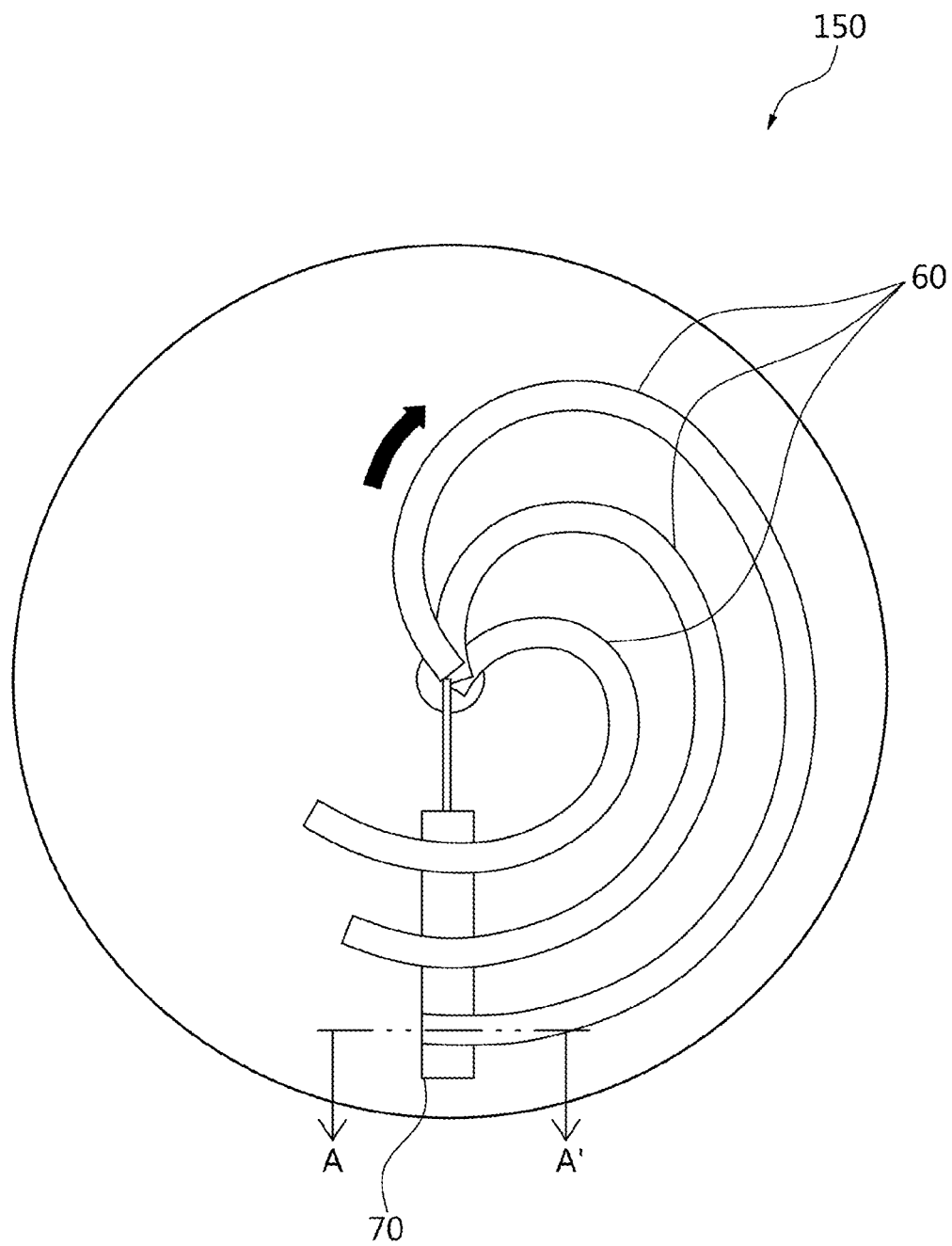
FIG. 7 is a view illustrating a fuel cap for a vehicle, which is configured to generate a locking sound, according to a third embodiment of the present disclosure.
Figure 8:
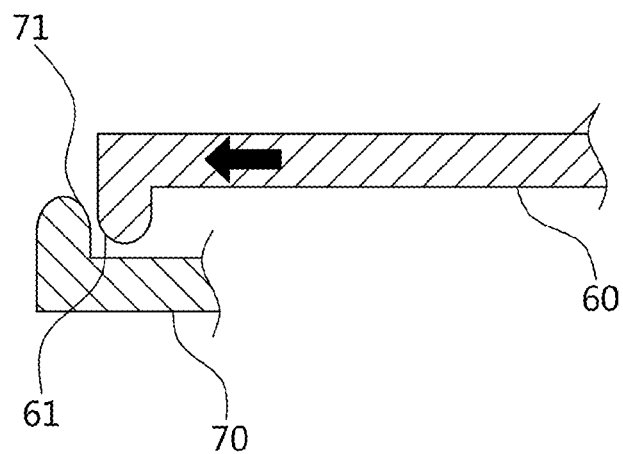
FIG. 8 is a cross-sectional view taken along the line A-A' of a sound generator and a striking portion of the fuel cap for a vehicle shown in FIG. 7.

FIG. 7 is a view illustrating a fuel cap for a vehicle, which is configured to generate a locking sound, according to a third embodiment of the present disclosure, and FIG. 8 is a cross-sectional view taken along the line A-A' of a sound generator and a striking portion of the fuel cap for a vehicle shown in FIG. 7.

As shown in FIG. 7, detailed descriptions of a component and a configuration of a fuel cap 150 for a vehicle, which generates the locking sound, according to the third embodiment of the present disclosure overlap with those of the components and the configurations of FIGS. 1 to 4, and thus they will be omitted.

However, the fuel cap 150 for a vehicle shown in FIG. 7 is different from the fuel cap 100 for a vehicle shown in FIGS. 1 to 4 in a structure for generating the locking sound. That is, a plate-shaped sound generator 60 is installed at a head portion of the fuel cap 150 for a vehicle, and a bar-shaped striking portion 70 is installed at a body portion of the fuel cap 150 for a vehicle.

Here, a sound interval may be set according to a length of the sound generator 60, and a low-note sound may be generated as the length of the sound generator 60 is shortened. Further, a case in which one striking portion 70 is installed is shown in FIG. 7, and alternatively, a plurality of striking portions 70 may be disposed and spaced apart by a predetermined angle. For example, three striking portions 70 may be disposed and spaced apart by 120 degrees.

The body portion is fixed by thread locking at a time when the fuel cap 150 for a vehicle of FIG. 7 is locked to the fuel inlet. Then, after the body portion is fixed by thread locking, the head portion is further rotated by a locking torque (a force for a complete sealing).

In this case, since the sound generator 60 of the head portion is fixed to the head portion, the sound generator 60 is integrally rotated with the head portion. Then, the sound generator 60 of the head portion is rotated and struck by the striking portion 70 of the fixed body portion. At this point, the sound generator 60 generates a sound due to the strike of the striking portion 70.

Referring to FIG. 8, a first protrusion 61 is formed to protrude downward toward the striking portion 70 at a distal end of the sound generator 60 of the head portion, and a second protrusion 71 is formed to protrude upward toward the sound generator 60 at a distal end of the striking portion 70 of the body portion. In this case, the striking portion 70 is formed such that a bar-shaped second protrusion 71 is formed to protrude toward the sound generator 60 along a length direction, and alternatively, a point-shaped second protrusion 71 is formed to protrude toward the sound generator 60 at a position corresponding to the first protrusion 61 of the sound generator 60.

Further, the first protrusion 61 of the sound generator 60 and the second protrusion 71 of the striking portion 70 are each formed in a rounded shape. That is, the first protrusion 61 of the sound generator 60 may be struck by the second protrusion 71 of the striking portion 70, and then escape from the second protrusion 71 of the striking portion 70 due to the rounded shape without being hooked at the second protrusion 71.

Figure 9:
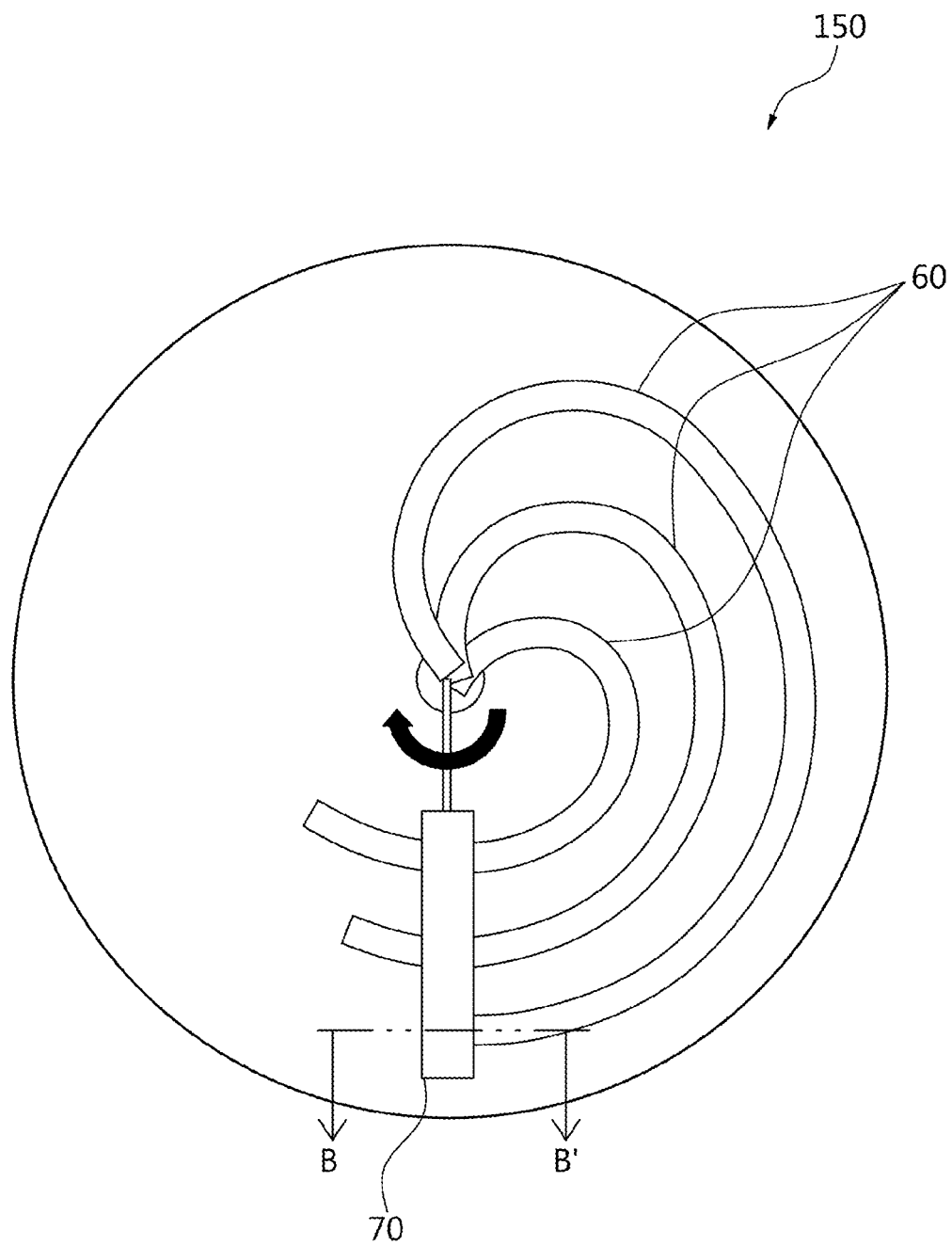
FIG. 9 is a view illustrating a fuel cap for a vehicle, which is configured to generate a locking sound, according to a fourth embodiment of the present disclosure.
Figure 10:
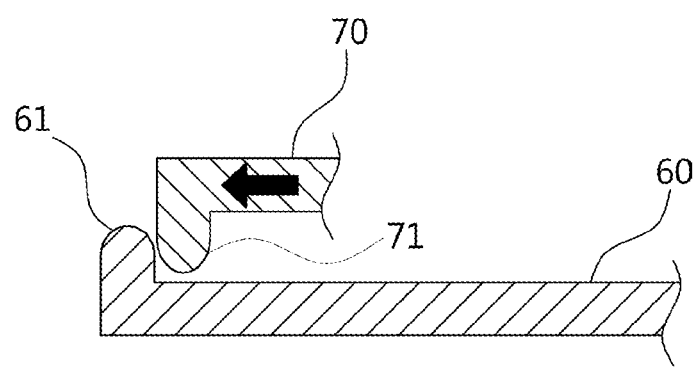
FIG. 10 is a cross-sectional view taken along the line B-B' of a sound generator and a striking portion of the fuel cap for a vehicle shown in FIG. 9.

FIG. 9 is a view illustrating a fuel cap for a vehicle, which is configured to generate a locking sound, according to a fourth embodiment of the present disclosure, and FIG. 10 is a cross-sectional view taken along the line B-B' of a sound generator and a striking portion of the fuel cap for a vehicle shown in FIG. 9.

Detailed descriptions of FIGS. 9 and 10 overlap with those of FIGS. 7 to 8, and thus they will be omitted.

However, referring to FIGS. 9 and 10, a striking portion 70 is installed at ahead portion, and a plate-shaped sound generator 60 is installed at a body portion.

In this case, since the striking portion 70 of the head portion is fixed to the head portion, the striking portion 70 is integrally rotated with the head portion. Then, the striking portion 70 of the head portion is rotated to strike the sound generator 60 of the fixed body portion. At this point, the striking portion 70 of the head strikes the sound generator 60 to generate a sound.

Referring to FIG. 10, a second protrusion 71 is formed to protrude downward toward the sound generator 60 at a distal end of the striking portion 70 of the head portion, and a first protrusion 61 is formed to protrude upward toward the striking portion 70 at a distal end of the sound generator 60 of the body portion.

In accordance with exemplary embodiments of the present disclosure, it is possible to change feel of a driver and provide amusement thereto by implementing a locking structure for generating a locking sound in various sound intervals inside a fuel cap for a vehicle.

Further, in accordance with exemplary embodiments of the present disclosure, it is possible to impress a consumer and receive a high IQS score to improve a brand value by adding amusement, which causes customer's impression, away from a simplified function for verifying a locked state of the fuel cap for a vehicle.

Furthermore, in accordance with exemplary embodiments of the present disclosure, it is possible to implement a brand identity related to a sound in a vehicle through collaboration with marketing and planning departments.

Moreover, in accordance with exemplary embodiments of the present disclosure, it is possible to make a customized sound, which is desired by the customer, through tuning of a sounding box.

Although the foregoing description has been described with a focus on novel features of the present disclosure as being applied to various embodiments, those skilled in the art will be appreciated that various deletions, substitutions, and alterations can be made from the forms and details of the above-described apparatus and method without departing from the scope of the present disclosure. Accordingly, the scope of the present disclosure is defined by the appended claims rather than the foregoing description. All variations equivalent to the scope of the appended claims will fall within the scope of the present disclosure.

What is claimed is:

1. A fuel cap for a vehicle, which has a locking structure configured to generate a sound interval, comprising:
   a head portion having a handle formed at a first side and one or more striking portions installed at a second side; and
   a body portion integrally assembled with the head portion and having a plurality of sound generators installed at the body portion and disposed in a state of being struck by the one or more striking portions installed at the second side of the head portion according to a rotation of the head portion by a locking torques,
   wherein each of the plurality of sound generators has a spiral-structured plate shape, the sound generators are of different length, and a first protrusion is formed to protrude toward the striking portion at a distal end of each of the plurality of sound generators, and
   wherein each of the striking portions has a bar shape, and a second projection is formed to protrude toward each of the plurality of sound generators at a position of a distal end of each of the striking portions, wherein the position corresponds to the first protrusion.

2. The fuel cap of claim 1, wherein each of the striking portions is installed at a circular frame having an installation recess configured to dispose, fix, and space apart the striking portions at predetermined intervals.

3. The fuel cap of claim 2, wherein each of the striking portions is disposed on a circumference formed by the circular frame.

4. The fuel cap of claim 3, wherein each of the striking portions includes one end inserted into and supported on the circular frame and wound in a spring shape, and another end configured to strike the plurality of sound generators and formed in a shape in which a distal portion of the another end is bent inward.

5. The fuel cap of claim 1, wherein the plurality of sound generators are grouped into a predetermined number of sound generators, the predetermined number of sound generators are repeatedly disposed, and the plurality of sound generators are pipe-shaped cylinders and have different outer diameters.

6. The fuel cap of claim 1, wherein:
the head portion and the body portion are integrally rotated when the fuel cap for a vehicle is locked to a fuel inlet of the vehicle, and
at a time when the fuel cap for a vehicle is locked to the fuel inlet of the vehicle, the body portion is fixed by thread locking, and the head portion is further rotated by the locking torque.

7. The fuel cap of claim 1, wherein the first protrusion and the second protrusion are each formed in a rounded shape.

8. A fuel cap for a vehicle, which has a locking structure configured to generate a sound interval, comprising:
a head portion having a handle formed at a first side and a plurality of sound generators installed at a second side; and
a body portion integrally assembled with the head portion and having one or more striking portions installed at the body portion and disposed in a state of being struck by the plurality of sound generators installed at the second side of the head portion according to a rotation of the head portion by a locking torque,
wherein the plurality of sound generators are grouped into a predetermined number of sound generators, the predetermined number of sound generators are repeatedly disposed, and the plurality of sound generators are pipe-shaped cylinders and have different outer diameters.

9. The fuel cap of claim 8, wherein each of the striking portions is installed at a circular frame having an installation recess configured to dispose, fix, and space apart the striking portions at predetermined intervals.

10. The fuel cap of claim 9, wherein each of the striking portions is disposed on a circumference formed by the circular frame.

11. The fuel cap of claim 10, wherein each of the striking portions includes one end inserted into and supported on the circular frame and wound in a spring shape, and another end configured to strike the plurality of sound generators and formed in a shape in which a distal portion of the another end is bent inward.

12. The fuel cap of claim 8, wherein:
the head portion and the body portion are integrally rotated when the fuel cap for a vehicle is locked to a fuel inlet of the vehicle, and
at a time when the fuel cap for a vehicle is locked to the fuel inlet of the vehicle, the body portion is fixed by thread locking, and the head portion is further rotated by the locking torque.

13. The fuel cap of claim 8, wherein:
each of the plurality of sound generators has a spiral-structured plate shape, the sound generators are of different length, and a first protrusion is formed to protrude toward the striking portion at a distal end of each of the plurality of sound generators, and
each of the striking portions has a bar shape, and a second projection is formed to protrude toward each of the plurality of sound generators at a position of a distal end of each of the striking portions, wherein the position corresponds to the first protrusion.

14. The fuel cap of claim 13, wherein the first protrusion and the second protrusion are each formed in a rounded shape.

* * * * *